United States Patent
Papadatos

(10) Patent No.: US 6,286,389 B1
(45) Date of Patent: Sep. 11, 2001

(54) PARKING BRAKE ACTUATING ASSEMBLY WITH IMPROVED LOCKOUT STRUCTURE

(75) Inventor: George Papadatos, Vaughan (CA)

(73) Assignee: Ventra Group Inc., Ontario (CA)

( * ) Notice: Subject to any disclaimer, the term of this patent is extended or adjusted under 35 U.S.C. 154(b) by 0 days.

(21) Appl. No.: 09/488,641

(22) Filed: Jan. 21, 2000

Related U.S. Application Data

(60) Provisional application No. 60/116,817, filed on Jan. 21, 1999.

(51) Int. Cl.$^7$ ............................................. B60T 7/08
(52) U.S. Cl. ................................. 74/535; 74/529
(58) Field of Search ........................ 74/535, 536, 537, 74/538, 529

(56) References Cited

U.S. PATENT DOCUMENTS

| | | |
|---|---|---|
| 4,267,748 | 5/1981 | Grunewald et al. . |
| 4,515,036 * | 5/1985 | Dotson .................................. 74/535 |
| 4,612,823 | 9/1986 | De Leeuw et al. . |
| 4,819,501 | 4/1989 | Kraus et al. . |
| 4,841,798 | 6/1989 | Porter et al. . |
| 4,949,592 | 8/1990 | Yamazaki et al. . |
| 5,211,072 | 5/1993 | Barlas et al. . |
| 5,217,094 | 6/1993 | Walter et al. . |
| 5,235,867 | 8/1993 | Wortmann et al. . |
| 5,272,935 * | 12/1993 | Heinemann et al. ............... 74/535 X |
| 5,309,786 | 5/1994 | Pare' et al. . |
| 5,533,420 | 7/1996 | Perisho . |
| 5,611,249 | 3/1997 | Perisho et al. . |
| 5,758,547 | 6/1998 | Smale . |
| 5,787,761 * | 8/1998 | Wang .................................... 74/535 |
| 5,907,977 | 6/1999 | Huebner et al. . |
| 6,131,483 * | 10/2000 | Kuller et al. .......................... 74/535 |

FOREIGN PATENT DOCUMENTS

| | | | |
|---|---|---|---|
| 3900661 * | 7/1990 | (DE) ..................................... | 74/535 |

* cited by examiner

*Primary Examiner*—Mary Ann Green
(74) *Attorney, Agent, or Firm*—Pillsbury Winthrop LLP

(57) ABSTRACT

A parking brake actuating assembly that has a lockout structure constructed and arranged to enable a lockout operation to be performed by applying tension to the brake cable opposite the brake activating direction so as to rotate the take-up member in the cable slackening direction against the biasing force of the take-up spring until the take-up member reaches the lockout position and the lockout structure is caused to move towards and into the releasable retaining position thereof in response to the take-up member moving into the lockout position thereof to thereby releasably lock the take-up member in the lockout position thereof.

21 Claims, 5 Drawing Sheets

PARKING BRAKE ACTUATING ASSEMBLY WITH IMPROVED LOCKOUT STRUCTURE

The present application claims priority to U.S. Provisional Appln. of Papadatos, Ser. No. 60/116,817, filed Jan. 21, 1999, the entirety of which is hereby incorporated into the present application by reference for all purposes.

FIELD OF THE INVENTION

The present invention relates to a parking brake actuating assembly for installation in a passenger compartment of a motor vehicle that has a brake system actuated by applying tension in a brake activating direction to a brake cable. More particularly, the present invention relates to a parking brake actuating assembly having a spring-biased cable take-up member and improved lockout structure.

BACKGROUND OF THE INVENTION

U.S. Pat. No. 5,235,867 to Wortmann et al., the entirety of which is hereby incorporated into the present application by reference, discloses a parking brake assembly that has a take-up member for taking up slack in a brake cable. The take-up member is spring biased to rotate the same in a cable take-up direction to pretension one or more brake cables attached thereto. In order to facilitate connection of the vehicle brake cable(s) to the take-up member, a lockout structure is provided. The '867 discloses the lockout structure in the form of either an axially displaceable pin, a spring, or a lockout pawl. The lockout structure engages the take-up member to retain the same against rotational movement, thereby eliminating the need to manually restrain the take-up member against spring-biased rotational movement during connection of the brake cable(s) thereto.

In the embodiments of the '867 patent, two steps are required to reset the lockout structure in the position wherein it retains the take-up member in the lockout position thereof to facilitate disconnection and subsequent reconnection of the brake cable during repair situations. In each embodiment, the repair technician is required to (a) apply tension to the brake cable opposite the brake activating direction thereof until the take-up member is rotated into the lockout position thereof, and (b) while maintaining the take-up member in the lockout position thereof, manually move the lockout structure into its operative position for retaining the take-up member in its lockout position. This can be extremely difficult to accomplish for one technician and routinely two technicians are employed to reset the lockout structure: one to apply the required tension to the cable and the other to manually move the lockout structure into its operative position.

Consequently, there exists a need in the art for a hand-operated parking brake actuating assembly that eliminates the difficulties encountered when attempting to reset the lockout structure of the aforementioned '867 patent.

SUMMARY OF THE INVENTION

It is therefore an object of the present invention to meet the above-described need. To achieve this object, the present invention provides a parking brake actuating assembly for installation in a passenger compartment of a motor vehicle of the type having a brake system that is actuated to prevent vehicle wheel rotation and hence rolling movement of the vehicle by applying tension in a brake activating direction to a one or more vehicle brake cables that connect to the brake system. The parking brake actuating assembly comprises an actuator member constructed and arranged to be moved in a brake applying direction and a brake releasing direction. The actuating assembly may be of either the hand or foot operated type and thus the actuator member may be a hand-operated actuator member with a grip portion or a foot-operated actuator member such as a pedal. A cable take-up member is mounted to the actuator member. The cable take-up member is rotatable relative to the actuator member in a cable tensioning direction and a cable slackening direction opposite the cable tensioning direction and is connectable to the vehicle brake cable(s).

A take-up spring is constructed and arranged to apply a biasing force to the cable take-up member that tends to rotate the take-up member relative to the actuator member in the cable tensioning direction thereof Lockout structure is movable between (a) a releasable retaining position wherein, when the cable take-up member is in a lockout position thereof, the lockout structure releasably retains the take-up member in the lockout position thereof and prevents rotation thereof under the biasing force of the take-up spring in the cable tensioning direction, thereby enabling the vehicle brake cable(s) to be connected to or disconnected from the take-up member, and (b) a releasing position wherein the lockout structure releases the take-up member for rotation under the biasing force of the take-up spring in the cable tensioning direction thereof away from the lockout position and towards and into a pretensioning position so as to pretension the brake cable(s) in the brake activating direction. Retaining structure is constructed and arranged to releasably retain the take-up member in the pretensioning position with respect to the actuator member such that moving the actuator member in the brake applying direction moves the take-up member so as to apply further tension to the brake cable in the brake activating direction and such that thereafter moving the actuator member in the brake releasing direction moves the take-up member so as to release the further tension applied to the brake cable in the brake activating direction.

The lockout structure is constructed and arranged to enable a lockout operation to be performed by applying tension to the brake cable opposite the brake activating direction so as to rotate the take-up member in the cable slackening direction against the biasing force of the take-up spring until the take-up member reaches the lockout position and the lockout structure is caused to move towards and into the releasable retaining position thereof in response to the take-up member moving into the lockout position thereof to thereby releasably lock the take-up member in the aforesaid lockout position thereof. As a result, the lockout operation can be performed by a single technician simply by pulling or otherwise applying tension to the brake cable.

Other objects, features, and advantages of the present invention will become apparent from the following detailed description, the accompanying drawings, and the appended claims.

DETAILED DESCRIPTION OF THE INVENTION

Figure 1:
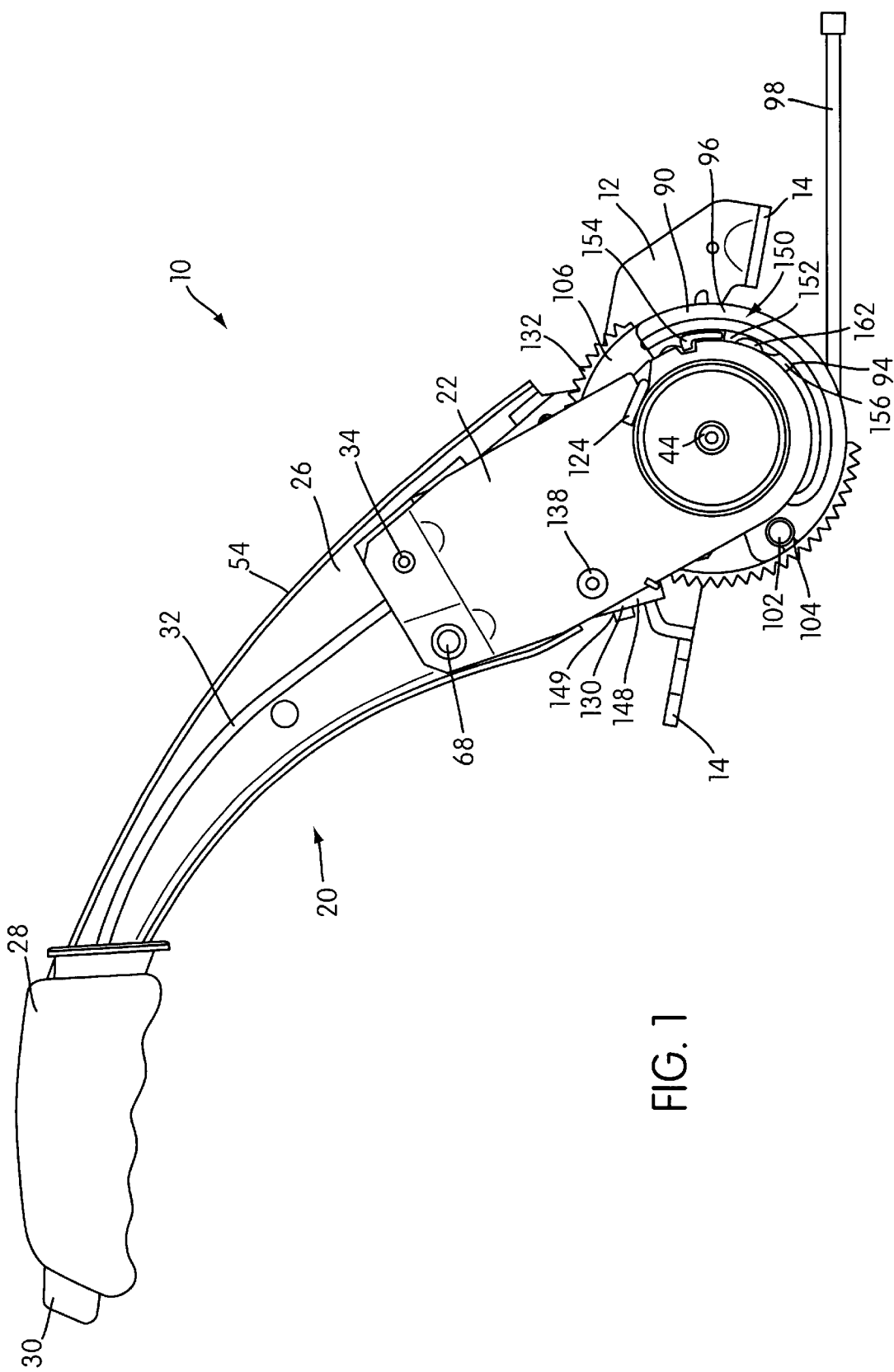
FIG. 1 is a profile view of a hand-operated parking brake actuating assembly constructed in accordance with the principles of the present invention.
Figure 2:
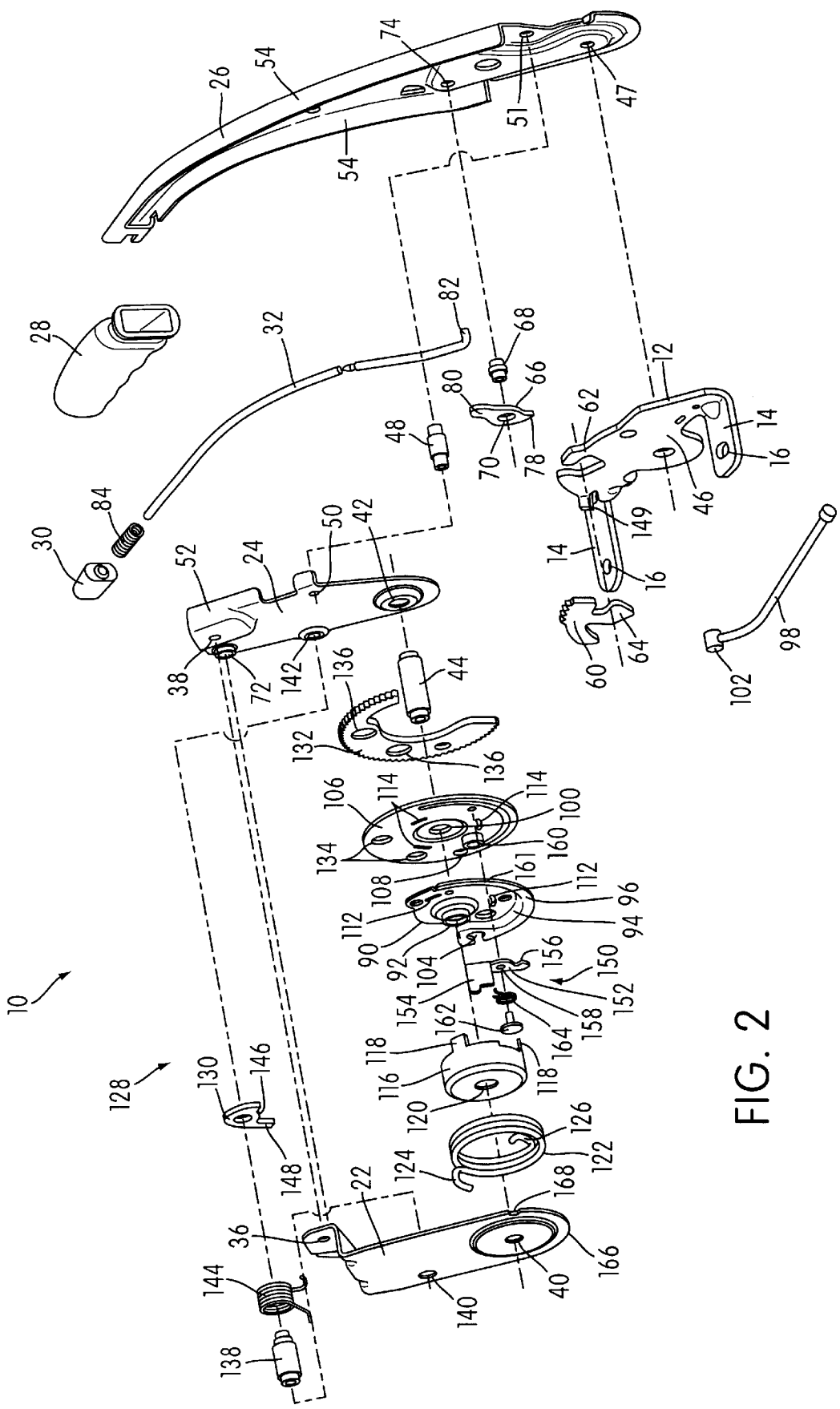
FIG. 2 is an exploded view of the actuating assembly of FIG. 1.

FIG. 1 shows a hand-operated parking brake actuating assembly, generally indicated at 10, for installation in a passenger compartment of a motor vehicle (not shown). The assembly 10 illustrated is of the type normally found between the driver and passenger seats in the vehicle's passenger compartment. The motor vehicle has a brake system (not shown) that is actuated to prevent wheel rotation and hence rolling movement of the vehicle by applying tension in a brake activating direction to one or more vehicle brake cables (not shown) that connect to the brake system. The vehicle and the brake system thereof are not considered part of the present invention and instead the present invention is concerned with the actuating assembly 10 that enables manual activation of the brake system. Thus, the vehicle and its brake system are not described in any particular detail herein.

The actuating assembly 10 comprises a mounting bracket 12 constructed and arranged to be secured to fixed structure within the motor vehicle, such as the floor pan member. The bracket 12 has pair of flanges 14 that engage the floor pan member and provide a plurality of fastener receiving bores 16 for receiving fasteners therein to affect securement of the bracket 12 to the floor pan member or other such structure within the vehicle.

The actuating assembly 10 further comprises an hand-operated actuator member, generally indicated at 20. The actuator member 20 is constructed and arranged to be manually moved by the driver's hand in a brake applying direction and a brake releasing direction opposite the brake applying direction. In the illustrated embodiment the actuator member 20 pivots in the brake applying and releasing directions, although the present invention is not intended to be limited to pivotal movement. In FIG. 1, the brake applying direction is clockwise and the brake releasing direction is counterclockwise.

The actuator member 20 comprises a pair of rigid arms 22 and 24 that are coupled together and a manually movable or hand-operated elongated lever 26 that is fixedly mounted to the arm 24. The lever 26 has a manually engageable grip 28 that is molded to provide a contoured exterior surface that ergonomically accommodates manual grasping by the driver's hand. A manually operable push button 30 extends from the free end of the grip 28 as is conventional in the art and a rigid link member in the form of an elongated metal rod 32 is connected to the push button 30. Manually depressing the push button 30 pushes the rod 32 in the longitudinal direction of the lever 26. The role and function of the rod 32 as it relates to operation of the actuating assembly 10 will be discussed in further detail later in the application.

The arms 22, 24 are secured together by a fastener 34 inserted through a pair of aligned fastener receiving openings 36, 38 formed in the arms 22, 24. Each arm 22, 24 has a pivot mounting bore 40, 42 formed therethrough. Opposing ends of a main pivot shaft 44 are received in the pivot mounting bores 40, 42 and one of those ends is also received in both a pivot mounting bore 46 formed through a portion of the bracket 12 and a pivot mounting bore 47 formed through a portion of the lever 26. Fasteners such as threaded nuts or welded heads are secured to the ends of the shaft 44 to secure the same in place and thus pivotally mount the arms 22, 24 and the lever 26 (and hence the actuator member 20) to the bracket 12 for their pivotal brake applying and releasing movements.

A stop member 48 is inserted through bore 50 in arm 24 and a corresponding bore 51 on the lever 26. When the actuator member 20 is being moved in the brake releasing direction thereof, the stop member 48 contacts an upper edge of the bracket 12 to prevent movement thereof beyond a maximum brake released position. The lever 26 and the arm 24 have flanges 52, 54 that extend laterally and space the arm 24 and lever 24 apart and shield the space therebetween.

The mounting bracket 12 carries a fixed sector gear 60 that has a plurality of teeth arranged concentrically with respect to the pivot axis of the actuator member 20. The bracket 12 has a recessed portion 62 formed inwardly from the periphery thereof. The sector gear 60 has a mounting portion in the form of a tab 64 having a shape complementary to the shape of the recessed portion 62. The tab 64 is received in the recessed portion 62 and welded in place or the like to secure the sector gear 60 to the bracket 12. The gear 60 as illustrated is formed separately from the bracket 12 to obviate the need for machining the teeth of the gear 60 into the metal of the bracket 12 itself. However, the bracket 12 and sector gear 60 can be formed together as a single piece if desired.

As is conventional with parking brake actuating assemblies, the rod 32 is connected to a releaseable locking structure in the form of a pivotally mounted pawl 66. The pawl 66 is pivotally mounted between the arm 24 and the lever 26 by a pawl shaft 68. The pawl 66 has a central opening 70 formed therethrough. The shaft 68 is inserted through the opening 70 and the opposing ends thereof are pivotally or fixedly received in bores 72, 74 formed in the arm 24 and the lever 26. The pawl 66 has a tooth 76 that is constructed and arranged to engage the teeth of the sector gear 60. The pawl 66 also has a bore 80 that receives the proximal end 82 of the rod 32 such that longitudinal movement of the rod 32 as a result of depressing the push button 30 pivots the pawl 66 so as to disengage the tooth 78 thereof from the sector gear 60 and permit free pivotal movement of the actuator member 20 relative to the bracket 12. A spring 84 mounted within grip 28 biases the push button 30 away from its depressed condition to normally maintain the pawl 66 in a position wherein the tooth 78 engages the sector gear 60.

When the tooth 78 of the pawl 66 engages the sector gear 60, the actuator member 20 may be pivoted about its axis in the brake applying direction thereof in a ratcheting manner. During this ratcheting movement, the tooth 78 rides over each successive tooth of the sector gear 60 and pivots about its shaft 68 to momentarily disengage itself from the gear teeth to permit movement of the actuator member 20 in the brake applying direction. As the tooth 78 rides over each tooth of the sector gear 60, the spring 84 biases the pawl 66 back around shaft 68 via the rod 32 and push button 30 to re-engage the tooth 66 with the successive tooth of gear 60. When one attempts to move the actuator member 20 in the brake releasing direction without depressing button 30 to disengage the pawl 66 from gear 60, the pawl 66 binds with the gear tooth with which it is engaged to prevent this brake releasing movement. Thus, the pawl 66 may be considered to function as a one-way ratchet that permits movement of the actuator member 20 in the brake applying direction thereof irrespective of whether the push button 30 is depressed and prevents movement of the actuator member 20 in the brake releasing direction absent depression of the push button. This arrangement is well known in the art and any other suitable arrangement may be substituted therefor. The use of a ratcheting arrangement is preferred and the present invention is not intended to be limited to such an arrangement.

The actuating assembly 10 further comprises a cable take-up member in the form of a generally circular or disc-shaped cable take-up reel 90. The cable take-up reel 90 has a bore 92 formed through the center thereof for mounting the reel 90 on the shaft 44 for rotational movement about the shaft 44. The reel 90 has an annular flange 94 extending axially from the periphery thereof and another flange 96 extends radially from the end of flange 94. An actuating cable 98 connected to the take-up reel 90 is trained over flange 94 and flange 96 restricts the cable 98 from axial movement relative to the take-up reel 90, thereby preventing the cable 98 from coming off flange 94. The flange 94 has an elongated slot 94 formed therethrough.

The end of the actuating cable 98 has a cylindrical head 102 and the reel 90 has a partially cylindrical opening 104 in which the head 102 is received to connect the cable 98. It is contemplated that the cable 98 is assembled as part of the brake actuating assembly 10 and constitutes the cable connecting portion thereof which is constructed and arranged to be connected to the vehicle brake cable(s) of the vehicle braking system. Preferably, the cable 98 will be connected to an equalizer (not shown) that enables the single cable 98 to be connected to a pair of vehicle cables connected to the vehicle braking system and in that arrangement the equalizer may be considered the brake cable connecting portion. Regardless, the present invention is intended to encompass any way of connecting the vehicle's brake cables to the take-up reel 90 irrespective of how such connection is accomplished.

The take-up reel 90 has a generally circular disc 106 coupled thereto. The disc 106 has approximately the same radial dimension as the flange 96 on reel 90 so that the periphery of the disc 106 and the flange 96 restrain movement of the cable 98 off the reel 90 in either direction. The disc 106 also has a bore 108 for receiving the head 102 of the cable 98 in cooperation with the opening 104 on the reel 90. The disc 106 also has a bore 110 formed through the center thereof for mounting the disc 106 on the shaft 44 for rotational movement about the shaft 44.

The reel 90 and the disc 106 have a plurality (three) of slots 112, 114, respectively, formed therethrough that align with one another. A generally cylindrical hub 116 has a corresponding plurality of projections 118. The projections 118 are received in the slots 112, 114 to couple the reel 90 and the disc 106 together for rotation together about the shaft 44. The hub 116 also has a bore 120 formed through the central portion thereof for mounting the hub 116 on the shaft 44 for rotational movement about the shaft 44. The hub 116 serves to space the reel 90 from the arm 22 to provide space sufficient to accommodate the lockout structure which will be discussed in further detail hereinbelow.

Figure 3:
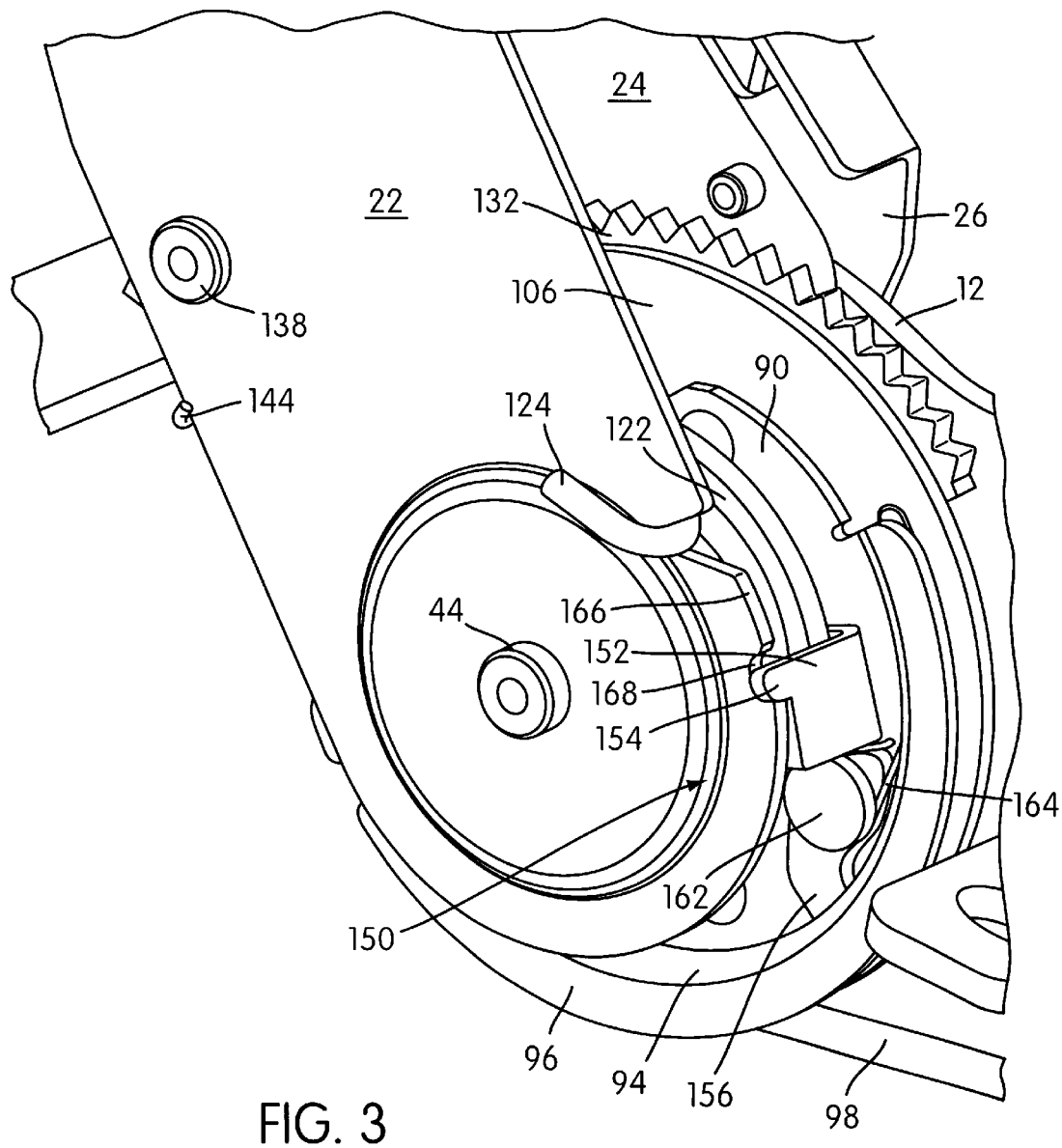
FIG. 3 is a close-up perspective view showing the actuating assembly of FIG. 1 with the take-up reel thereof in its lockout position and the lockout structure thereof in its releasable retaining position.

A take-up spring 122 in the form of a torsion spring is mounted about the exterior of the hub 116. The spring 122 has one end 124 connected to the arm 22 and the other end 126 thereof connected to the reel 90. The spring 90 is tensioned by either compression or extension so as to apply a biasing force to the take-up reel that tends to rotate the reel 90 (and the disc 106 and hub 116 therewith) about the shaft 44 in a cable tensioning direction relative to the actuator member 20. The cable tensioning direction is clockwise as viewed in FIG. 1. By rotating the reel 90 in the cable tensioning direction under spring biasing, the reel 90 applies tension to the vehicle brake cable(s) so as to remove any slack therefrom and ensure proper transmission of mechanical forces to the brake system. The spring 122 rotates the reel 90 to a pre-tensioning or equilibrium position whereat the vehicle brake cable(s) are pre-tensioned in the brake activating direction thereof with a tension that is counterbalanced by the force of the spring 122 and friction or the like. The reel 90 may also be rotated relative to the actuator member 20 in a cable slackening direction opposite the cable tensioning direction under certain conditions which are described hereinafter by pulling on the cable 98 to the right in FIG. 1 (i.e., opposite the brake activating direction). Specifically, the reel 90 is rotatable relative to the actuator member 20 in the slackening direction to a lockout position, which is shown in FIG. 3 and will be discussed in further detail hereinbelow.

Although the illustrated embodiment uses a torsion spring 122, the take-up spring may take any form, such as a linear coil spring or the like.

The actuating assembly 10 also comprises retaining structure 128 that is constructed and arranged to releasably retain the reel 90 in its pre-tensioning position with respect to the actuator member 20 such that moving the actuator member 20 in the brake applying direction thereof moves the take-up reel 90 so as to apply further tension beyond the initial pre-tensioning in the brake activating direction of the vehicle brake cable(s) and such that thereafter moving the actuator member 20 in the brake releasing direction moves the take-up reel 90 so as to release the further tension from the brake cable(s).

The retaining structure 128 in the illustrated embodiment is in the form of a pivotally mounted pawl 130 and a C-shaped sector gear 132 having its teeth arranged concentrically with respect to the take-up reel's axis of rotation. The present invention, however, is not intended to be limited to such an arrangement and may encompass other arrangements such as a spring clutch or the like. The sector gear 132 is fixedly mounted to the disc 106 by inserting fasteners (not shown) through bores 134, 136 formed through the disc 106 and the gear 132, respectively. The gear 132 rotates together with the disc 106 and reel 90 about the mounting shaft 44. The pawl 130 is pivotally mounted between the arms 22, 24 by a pivot shaft 138 that has its opposing ends mounted in bores 140, 142 formed in the arms 22, 24, respectively. A torsion spring 144 is mounted about the pivot shaft 138 and biases the pawl 130 in an engaging direction (which is clockwise as viewed in FIG. 1) to engage the tooth 146 of the pawl 130 with the teeth of the sector gear 132. When the pawl tooth 146 is engaged with the teeth of the sector gear 132, the actuator member 20 and the reel 90 pivot or rotate together about the shaft 44, thereby allowing for movement of the actuator member 20 in the brake applying direction thereof to rotate the reel 90 in the cable tensioning direction thereof to increase cable tension and also allowing for movement of the actuator member 20 in the brake releasing direction thereof to rotate the reel 90 in the cable slackening direction to decrease cable tension.

The retaining structure 128 functions as a ratchet device in the illustrated embodiment, although the present invention is not intended to be limited to such a ratcheting arrangement. Specifically, the pawl 130 acts in a ratcheting manner to allow the reel 90 to rotate in the cable tensioning direction thereof under the spring biasing force towards and into its pre-tensioning position. During this ratcheting movement, the tooth 146 rides over each successive tooth of the sector gear 132 and pivots about its shaft 138 to momentarily disengage itself from the gear teeth to permit movement of the reel 90 in the cable tensioning direction. As the tooth 146 rides over each tooth of the sector gear 132, the spring 144 biases the pawl 130 back around shaft 138 to re-engage the tooth 146 with the successive tooth of gear 132. When one attempts to rotate the reel 90 in the cable slackening direction by increasing cable tension without first affecting disengagement of the pawl 130 from the gear 132, the pawl 130 binds with the gear tooth with which it is engaged to prevent such movement. In this respect, the pawl 130 acts as a one-way ratchet that allows the cable take-up reel 90 to rotate under its spring biasing force in the cable tensioning direction thereof and prevents the reel 90 from rotating in the cable slackening direction thereof absent disengagement of the pawl 130 from the gear 130.

The pawl 130 has a contact trip member 148 opposite the tooth 146 thereof. When the actuator member 20 is moved to a maximum brake releasing position thereof, the contact trip member 148 contacts tab 149 on the bracket 12 or some other fixed structure in the assembly 10. As a result of this contact, the pawl 130 is caused to pivot against the biasing of spring 144 so as to disengage the tooth 146 thereof from the teeth of the sector gear 132.

The actuating assembly 10 further comprises a lockout structure, generally indicated at 150, associated with the cable take-up reel 90. The lockout structure 150 is movable between (a) a releasable retaining position wherein, when the take-up reel 90 is in its lockout position as shown in FIG. 3, the lockout structure 150 retains the reel 90 in the lockout position thereof and prevents rotation thereof under the biasing force of the spring 122 in the cable tensioning direction, thereby enabling the vehicle brake cable(s) to be easily connected to or disconnected from the reel 90, and (b) a releasing position wherein the lockout structure 150 releases the take-up member for rotation under the biasing force of the spring 122 in the cable tensioning direction thereof away from the lockout position and towards and into the above-discussed pre-tensioning position so as to pre-tension the vehicle brake cable(s) in the brake activating direction.

In the illustrated embodiment, the lockout structure 150 comprises a lockout lever 152 pivotally mounted to the reel 90 indirectly via its pivotal connection to the disc 106. The lockout lever 152 has an engaging portion 154, a contact trip portion 156, and a bore 158 formed through the central portion thereof. The disc 106 has a hub 160 that extends through bore 161 formed in the reel 90 and a fastener 162 is inserted through the bore 158 and into the hub 106 to pivotally mount the lever 152 with the trip portion 156 extending through a lot 97 in the reel flange 94. A torsion spring 164 is mounted about the fastener 162 and biases the lockout lever 152 towards and into the releasable retaining position thereof. Specifically, the spring 164 has one end engaged with the reel 90 and the other end engaged with the lever 152 such that the spring 164 biases the lever 152 in a counterclockwise direction (as viewed in FIG. 1) about fastener 162 towards and into its retaining position.

The peripheral edge 166 of arm 22 is for the most part smooth and continuous adjacent the lockout structure 150. As the reel 90 rotates relative to the actuator member 20, the engaging portion 154 of the lockout lever 152 rides along the edge 166. A notch 168 is provided on the edge 166 at the point where the engaging portion 154 is located when the reel 90 is rotated to the lockout position thereof. In this lockout position, the spring 164 biases the lever 152 into its retaining position so as to engage the engaging portion 154 with the notch 168. This engaged relationship prevents the reel 90 from rotating under the biasing force of the spring 122 in the cable slackening direction away from the lockout position. Thus, the spring 122 is effectively disabled from rotating the reel 90 relative to the actuator member 20 and the technician attempting to connect vehicle brake cable(s) to or disconnect vehicle brake cable(s) from the reel 90 does not have to manually prevent the reel 90 from rotating under spring bias.

The lockout lever 152 can be moved to the releasing position thereof either manually by engaging the lever trip portion 156 to effect manual disengagement of the engaging portion 154 or automatically by moving the actuator member 20 into the maximum brake applying position thereof. Specifically, when the reel 90 is in the lockout position thereof and the lever 152 is in the retaining position thereof, moving the actuator member 20 towards and into the maximum brake applying position thereof causes the trip portion 156 of the lever 152 to contact a structure within the assembly 10. Contacting this structure causes the lever 152 to be moved from the retaining position thereof to the releasing position thereof, thereby automatically or responsively releasing the take-up reel 90 for rotation under the biasing force of the spring 122 in the cable tensioning direction thereof.

In the illustrated embodiment, the lockout structure 150 is constructed and arranged such that when the actuating cable 98 is connected to the vehicle brake cable(s) the aforesaid structure that causes the lever 152 to move to the released position thereof is the actuating cable 98 under initial tension as a result of the actuator member 20 being moved in the brake applying direction thereof. This contact is made as a result of the trip portion 156 extending through slot 97 in reel flange 94. This prevents the releasing of the lockout structure 150 unless tension is applied to the cable 98 and the actuator member 20 is moved to the maximum brake applying direction thereof. Thus, the lockout structure 150 should not release prior to installation.

Operation

When the parking brake actuating assembly 10 of the present invention is initially installed in the vehicle, the reel 90 thereof is rotated to the lockout position thereof and the lever 152 is pivoted to the releasable retaining position thereof to retain the reel 90 at the lockout position thereof. Preferably, this is done at the by the actuating assembly manufacturer prior to delivery to the vehicle manufacturer to obviate the need for the vehicle manufacturer to have to perform these steps. The mounting bracket 12 is secured the vehicle floor pan member as discussed above and the vehicle brake cable(s) are connected to the reel 90 via cable 98 either directly or via an equalizer while the lockout lever 152 retains the reel 90 in the lockout position thereof. This condition is illustrated in FIG. 3.

A console cover (not shown) having an actuator receiving opening is mounted onto the bracket 12 to conceal the take-up reel 90, the lockout structure 150, the spring 122, and the other components associated therewith from view in the passenger compartment of the vehicle with the actuator member 20 extending outwardly from the actuator member receiving opening. Such console covers are well-known in the art and are used with almost every type hand-operated parking brake actuating assembly found in motor vehicles.

Figure 4:
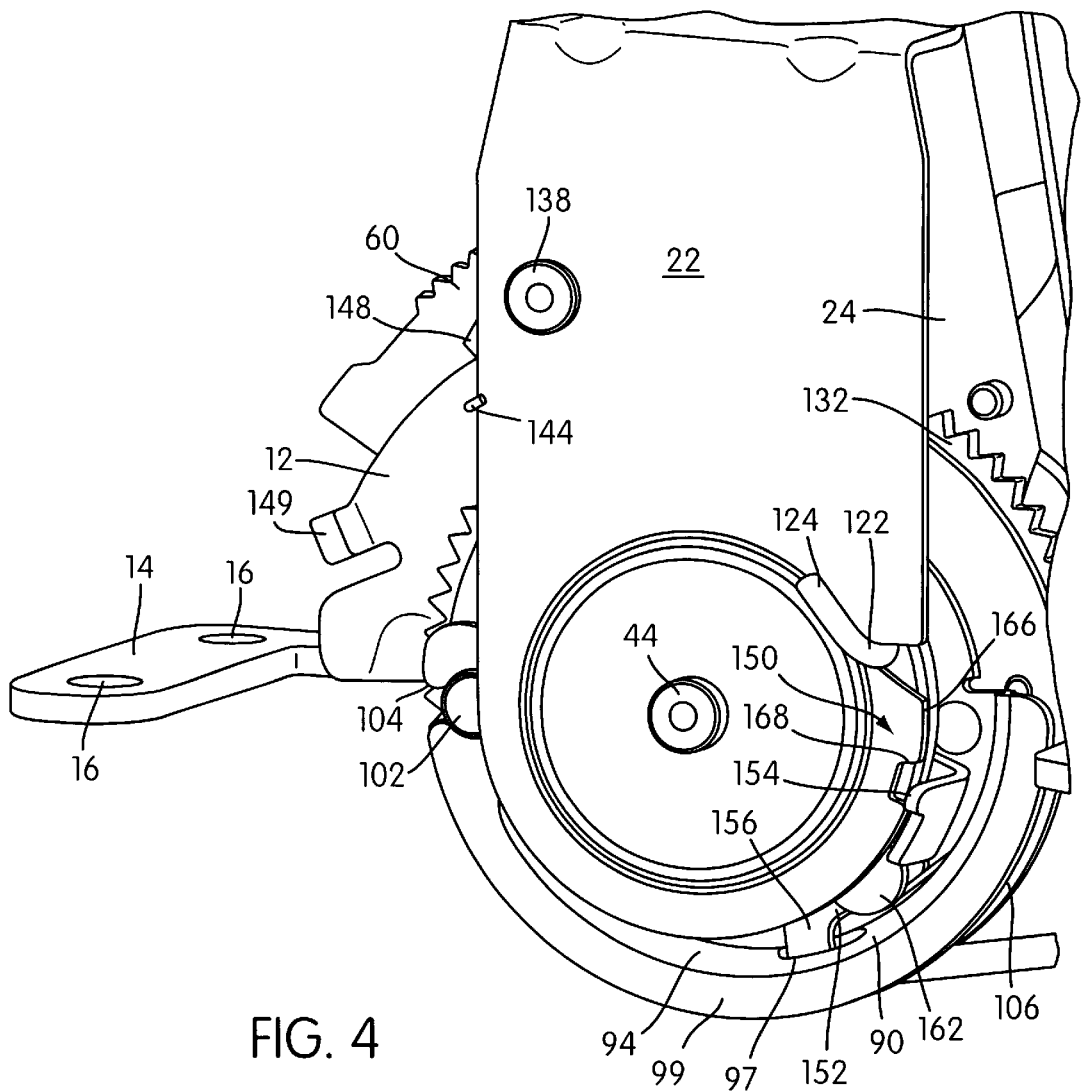
FIG. 4 is a view similar to FIG. 3 showing the lockout structure as it moves to the released position thereof.

To place the actuating assembly 10 in its normal operating condition and pre-tension the vehicle brake cable(s), the installing technician simply moves the actuator member 20 in the brake applying direction thereof towards and into the maximum brake applying direction. This initially tensions the actuating cable 98 and the vehicle brake cable(s) and causes the contact trip portion 156 of the lockout lever 152 to contact the initially tensioned cable 98 so as to responsively or automatically move the lever 152 into the releasing position thereof, thereby allowing the take-up reel 90 to rotate in the cable tensioning direction thereof under the biasing force of spring 122 towards and into the pre-tensioning position so as to pre-tension the actuating cable 98 and the vehicle brake cable(s) in the brake activating direction. This condition is illustrated in FIG. 4 wherein the engaging portion 154 is has just moved out of engagement with the notch 168 on arm 22.

The retaining structure 128 thereafter releasably retains the take-up reel 90 in the pre-tensioning position such that moving the actuator member 20 in the brake applying direction thereof moves the reel 90 so as to apply further tension to the vehicle brake cable(s) in the brake activating direction thereof and also such that moving the actuator member 20 in the brake releasing direction moves the reel 90 so as to release tension in the vehicle brake cable(s). In the event the vehicle brake cable(s) slacken over time, such as due to stretching, the ratcheting action of the disclosed retaining structure 128 allows the spring 122 to compensate by rotating the reel 90 relative to the actuator member 20 as needed in the cable tensioning direction thereof to maintain the appropriate amount of pre-tensioning in the vehicle brake cable(s). This is the normal operating condition in which the brake actuating assembly 10 is in when the vehicle comes off the assembly line and is delivered to the end customer.

Figure 5:
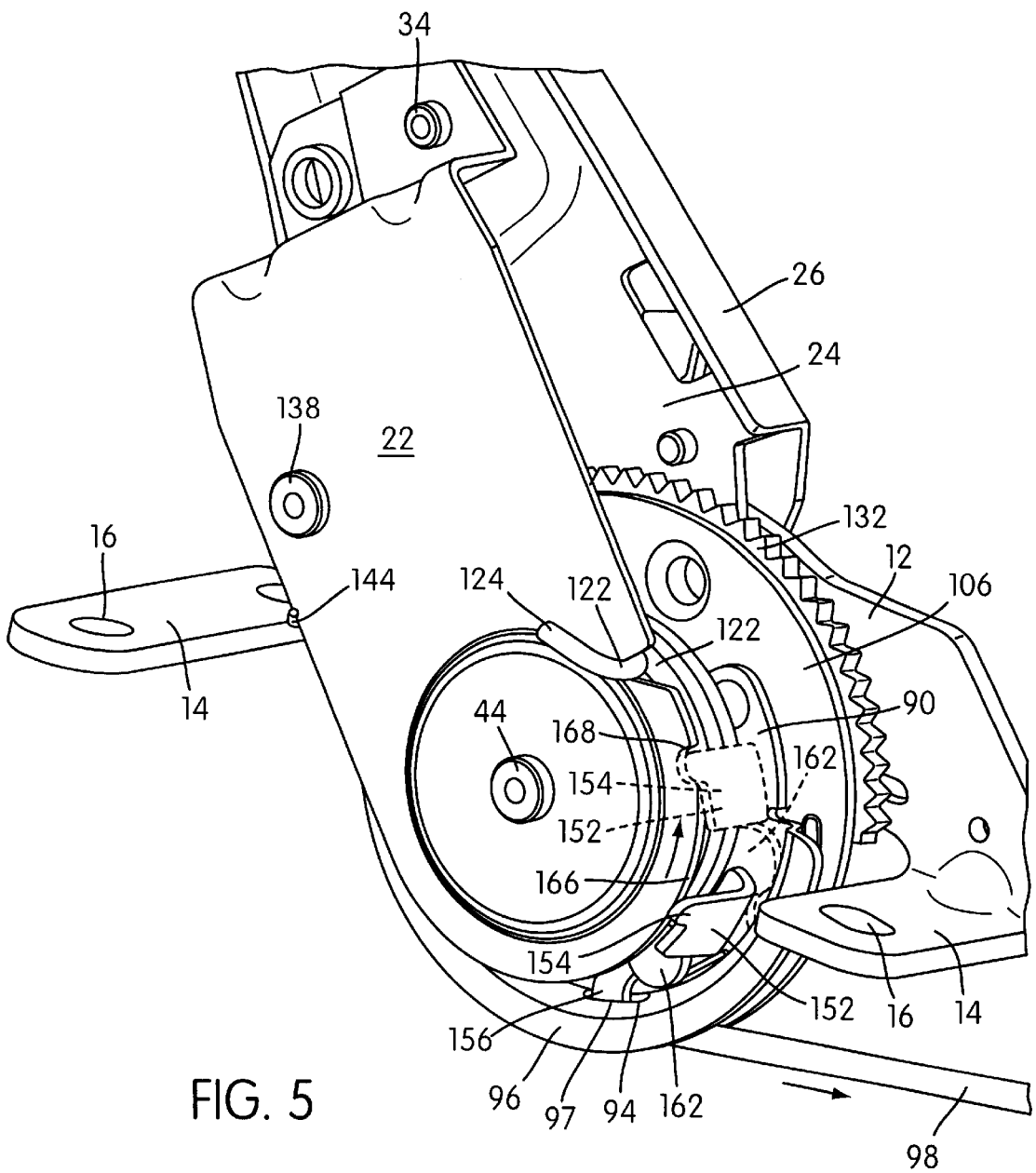
FIG. 5 is a view similar to FIG. 4 illustrating the manner in which the lockout operation is performed on the actuating assembly of the present invention with the lockout structure being illustrated in its releasing position in solid lines and in its releasable retaining position in phantom lines.

In the event that the vehicle brake system or the actuating assembly 10 itself need servicing some time after this point, a lockout operation can be performed as follows. The actuator member 20 is moved in the brake releasing direction to the maximum brake releasing position thereof. This cause the contact trip portion 148 of the pawl 130 of the retaining structure 128 to engage the tab 149 on bracket 12 and move the pawl 130 out of engagement with the sector gear 132, thus freeing the reel 90 for movement relative to the actuator member 20 in either the cable tensioning or slackening direction thereof. The technician then pulls the vehicle brake cable(s) or cable 98 so as to rotate the reel 90 in the cable slackening direction thereof until the reel 90 reaches the lockout position. Upon reaching the lockout position, the lockout lever 152 responsively moves under the biasing of spring 164 into its releasable retaining position with the engaging portion 154 thereof engaging notch 166 to retain the reel 90 against rotation under spring force back in the cable tensioning direction thereof. Thus, there is no need to manually manipulate the lever 152 to retain the reel 90 in its lockout position because the movement of the lever into the retaining position occurs in a responsive or automatic manner. FIG. 5 illustrates this operation.

To restore the assembly 10 back to its normal operating condition, the technician simply reconnects the vehicle brake cable(s) and moves the actuator member 20 into its maximum brake applying position as described above.

It can thus be appreciated that the objectives of the present invention have been fully and effectively accomplished. The foregoing specific embodiment has been provided simply to illustrate the structural and functional principles of the present invention and is not intended to be limiting. To the contrary, the present invention is intended to encompass all changes, alterations, and modifications within the spirit and scope of the appended claims.

What is claimed:

1. A parking brake actuating assembly for installation in a passenger compartment of a motor vehicle, the motor vehicle having a brake system that is actuated to prevent vehicle wheel rotation and hence rolling movement of said vehicle by applying tension in a brake activating direction to a vehicle brake cable that connects to said brake system, said parking brake actuating assembly comprising:

an actuator member constructed and arranged to be moved in a brake applying direction and a brake releasing direction;

a cable take-up member mounted to said actuator member, said cable take-up member being rotatable relative to said actuator member in a cable tensioning direction and a cable slackening direction opposite said cable tensioning direction, said cable take-up member being connectable to the vehicle brake cable, said cable take-up member being rotatable relative to said actuator member in said slackening direction thereof to a lockout position;

a take-up spring constructed and arranged to apply a biasing force to said cable take-up member that tends to rotate said take-up member relative to said actuator member in said cable tensioning direction thereof;

lockout structure movable between (a) a releasable retaining position wherein, when said cable take-up member is in said lockout position thereof, said lockout structure releasably retains said take-up member in said lockout position thereof and prevents rotation thereof under the biasing force of said take-up spring in said cable tensioning direction, thereby enabling the vehicle brake cable to be connected to or disconnected from said take-up member, and (b) a releasing position wherein said lockout structure releases said take-up member for rotation under the biasing force of said take-up spring in the cable tensioning direction thereof away from said lockout position and towards and into a pretensioning position so as to pretension the brake cable in said brake activating direction; and retaining structure constructed and arranged to releasably retain said take-up member in said pretensioning position with respect to said actuator member such that moving said actuator member in said brake applying direction moves said take-up member so as to apply further tension to said brake cable in said brake activating direction and such that thereafter moving said actuator member in said brake releasing direction moves said take-up member so as to release the further tension applied to said brake cable in said brake activating direction;

said lockout structure being constructed and arranged to enable a lockout operation to be performed by applying tension to said brake cable opposite said brake activating direction so as to rotate said take-up member in said cable slackening direction against the biasing force of said take-up spring until said take-up member reaches said lockout position and said lockout structure is caused to move towards and into said releasable retaining position thereof in response to said take-up member moving into said lockout position thereof to thereby releasably lock said take-up member in the aforesaid lockout position thereof.

2. A parking brake actuating assembly according to claim 1, wherein said retaining structure is constructed and arranged such that said retaining structure releases said take-up member for rotation in said cable tensioning direction under the biasing force of said take-up spring in response to said actuator member being moved into a maximum brake releasing position.

3. A parking brake actuating assembly according to claim 1, wherein said actuator member is a hand-operated actuator member having a grip constructed and arranged to enable said actuator member to be manually moved by hand.

4. A parking brake actuating assembly according to claim 3, wherein said retaining structure is constructed and arranged such that said retaining structure releases said take-up member for rotation in said cable tensioning direction under the biasing force of said take-up spring in response to said actuator member being moved into a maximum brake releasing position.

5. A parking brake actuating assembly according to claim 3, wherein said hand-operated actuator member comprises a hand-operated lever that pivots in said brake applying and releasing directions.

6. A parking brake actuating assembly according to claim 5, wherein said hand-operated lever and said take-up member rotate about a common axis.

7. A parking brake actuating assembly according to claim 3, further comprising a mounting bracket constructed and arranged to fixedly mount said actuating assembly to a floor pan of the motor vehicle.

8. A parking brake actuating assembly according to claim 7, further comprising a console cover having an actuator member receiving opening, said console cover being mounted so as to conceal said take-up member, said lockout structure, and said take-up spring from view in the passenger compartment of the vehicle with the actuator member extending outwardly from said actuator member receiving opening.

9. A parking brake actuating assembly according to claim 3, wherein said lockout structure comprises a lockout lever that pivots between said releasable retaining position and said releasing position and wherein said actuating assembly further comprises a lockout spring constructed and arranged to apply a biasing force that tends to pivot said lockout lever towards said lockout position thereof.

10. A parking brake actuating assembly according to claim 9, wherein said lockout lever is pivotally mounted to said take-up member and wherein said lockout lever when in said releaseable retaining position thereof engages said actuator member to retain said take-up member in the lockout position thereof.

11. A parking brake actuating assembly according to claim 10, wherein said actuator member has a notch that removably receives said lockout lever when in said releasable retaining position thereof.

12. A parking brake actuating assembly according to claim 10, wherein said lockout spring is a torsion spring.

13. A parking brake actuating assembly according to claim 3, further comprising an actuating cable connectable to the vehicle brake cable and wherein said take-up member is a disc-shaped cable take-up reel having said actuating cable trained over a peripheral edge thereof.

14. A parking brake actuating assembly according to claim 13, wherein said lockout structure is constructed and arranged such that, when said take-up member is in said lockout position thereof and said lockout structure is in said releaseable retaining position thereof, upon said actuator member reaching a maximum brake applying position thereof during movement thereof in said brake applying direction said lockout structure contacts a structure that causes said lockout structure to move from said releasable retaining position thereof to said releasing position thereof, thereby releasing said take-up member for rotation under the biasing force of said take-up spring in the cable tensioning direction thereof away from said lockout position and towards and into said pretensioning position so as to pretension the brake cable in said brake activating direction.

15. A parking brake actuating assembly according to claim 14, wherein said hand-operated actuator member comprises a hand-operated lever that pivots in said brake applying and releasing directions.

16. A parking brake assembly according to claim 15, wherein said hand-operated lever pivots and said take-up member rotate about a common axis.

17. A parking brake actuating assembly according to claim 14, further comprising a mounting bracket constructed and arranged to fixedly mount said actuating assembly to a floor pan of the motor vehicle.

18. A parking brake actuating assembly according to claim 17, further comprising a console cover having an actuator member receiving opening, said console cover being mounted so as to conceal said take-up member, said lockout structure, and said take-up spring from view in the passenger compartment of the vehicle with the actuator member extending outwardly from said actuator member receiving opening.

19. A parking brake actuating assembly according to claim 14, wherein said lockout structure is constructed and arranged such that when said actuating cable is connected to said vehicle brake cable the aforesaid structure that causes said lockout structure to move from said releasable retaining position thereof to said releasing position thereof is said actuating cable under initial tension as a result of said actuator being moved in said brake applying direction thereof.

20. A parking brake actuating assembly according to claim 19, wherein said lockout structure comprises a lockout lever that pivots between said releasable retaining position and said releasing position and wherein said actuating assembly further comprises a lockout spring constructed and arranged to apply a biasing force that tends to pivot said lockout lever towards said lockout position thereof.

21. A parking brake actuating assembly according to claim 20, wherein said lockout lever is pivotally mounted to said take-up member and wherein said lockout lever when in said releaseable retaining position thereof engages said actuator member to retain said take-up member in the lockout position thereof.

* * * * *